US008024385B2

(12) United States Patent
Karoji

(10) Patent No.: US 8,024,385 B2
(45) Date of Patent: Sep. 20, 2011

(54) PROGRAMMABLE CALCULATOR HAVING GUIDED CALCULATION MODE

(75) Inventor: Kosuke Karoji, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 241 days.

(21) Appl. No.: 12/414,896

(22) Filed: Mar. 31, 2009

(65) Prior Publication Data

US 2009/0254597 A1   Oct. 8, 2009

(30) Foreign Application Priority Data

Apr. 2, 2008   (JP) ................. P2008-096396

(51) Int. Cl.
*G06F 15/04* (2006.01)
(52) U.S. Cl. ........................ 708/130; 708/131
(58) Field of Classification Search .......... 708/200, 708/130, 131
See application file for complete search history.

(56) References Cited

U.S. PATENT DOCUMENTS

| | | | | |
|---|---|---|---|---|
| 5,532,946 | A * | 7/1996 | Phipps et al. | 708/174 |
| 6,167,412 | A * | 12/2000 | Simons | 708/105 |
| 7,499,848 | B2 * | 3/2009 | Irons | 703/23 |
| 7,840,621 | B2 * | 11/2010 | Yoshizawa | 708/130 |
| 2007/0050432 | A1 * | 3/2007 | Yoshizawa | 708/130 |
| 2007/0195093 | A1 * | 8/2007 | Springer et al. | 345/440.1 |
| 2009/0315741 | A1 * | 12/2009 | Kim | 341/23 |

FOREIGN PATENT DOCUMENTS

| | | |
|---|---|---|
| JP | 3-263249 A | 11/1991 |
| JP | 8-016518 A | 1/1996 |
| JP | 2001-290809 A | 10/2001 |
| JP | 2003-186383 A | 7/2003 |

OTHER PUBLICATIONS

Texas Instruments, "VoyageTM 200 Graphing Calculator", 2005 Texas Instruments Incorporated, pp. 1-1008.*
Japanese Office Action dated Mar. 23, 2010 and English translation thereof in counterpart Japanese Appln. No. 2008-096396.

* cited by examiner

*Primary Examiner* — Chuong D Ngo
(74) *Attorney, Agent, or Firm* — Holtz, Holtz, Goodman & Chick, PC

(57) ABSTRACT

A programmable calculator includes: a display unit; a calculation processing section configured to perform calculation processing; a calculation screen display control section configured to control the display unit to display a calculation screen; a base state setting section configured to set, as a base state, a calculation state; a base state storing section configured to store the base state that is set together with the calculation screen corresponding to the base state; an operation pattern storing section configured to store an operation pattern of a series of user operations that are input after the base state was set by the base state setting section; and a guide display control section configured to control the display unit to display a calculation screen corresponding to the arbitrary base state stored in the base state storing section, and to display, as guide indications, the stored operation pattern.

8 Claims, 7 Drawing Sheets

PROGRAMMABLE CALCULATOR HAVING GUIDED CALCULATION MODE

CROSS-REFERENCE TO THE RELATED APPLICATION(S)

The present application is based upon and claims priority from prior Japanese Patent Application No. 2008-096396, filed on Apr. 2, 2008, the entire content of which are incorporated herein by reference.

TECHNICAL FIELD

The present invention relates to a programmable calculator and a computer-readable storage medium containing a sequence of instructions for a program executable by a computer system for learning operation procedures for various mathematical exercises.

BACKGROUND

Conventionally, electronic calculators called graphing calculators (graphical scientific calculators) are in wide practical use, which are capable of calculating various function formulae input thereto and display calculation results numerically or graphically.

The graphing calculators are used in classrooms for learning calculation methods of various function formulae and graphical output of a locus of each function formulae.

For example, each student inputs operations for solving an exercise problem given by a teacher, causes its calculation or graphical display, and checks a result. More specifically, each student inputs operations following a manner of calculator operation that is performed actually by the teacher or shown on a distributed printouts of an operation manual and checks a displayed calculation result and a graph locus.

Whereas such graphing calculators have a wide variety of functions and capable of performing various kinds of calculation/display processing, each student is required to remember operation procedures corresponding to respective functions in order to fully utilize those wide variety of functions. There is a problem that even if students are taught to learn the operation procedures of prescribed functions in such a manner that a teacher demonstrates the operation procedures or distributes printouts of an operation manual, it is difficult for the student to learn them.

In view of the above, an electronic apparatus and its program have been proposed which allow students to easily learn operation procedures of a scientific calculator in the following manner. Pieces of information of key input operations performed by a teacher to solve exercise problems by using an emulator of a scientific calculator installed in a personal programmable calculator (PC), for example, are registered in advance as a learning assist program. The registered learning assist program is transmitted to scientific calculators of respective students over a communication network. Each student himself or herself manipulates necessary keys according to key input operation information while running, on his or her scientific calculator, the learning assist program transmitted from the PC of the teacher and causing related displays. An example of such system is disclosed in JP-A-2003-186383.

The above described conventional electronic apparatus and program allow each student to manipulate appropriate keys easily by themselves according to key input operation information which is displayed as guide indications according to the learning assist program transmitted to his or her scientific calculator.

On the other hand, key input operation information of each exercise problem or the like that is registered as part of the learning assist program can only be registered as a series of pieces of key input operation information (from its start to end) As a result, where, for example, an exercise problem is registered that requests students to draw and display a graph of a certain function formula and then to integrate it, determine an intersection, change a parameter value, or do a like operation, all pieces of key input operation information are set as a series and can only be displayed as guide indications in the registered order.

In addition, if three exercises of "integrating a graph of the function formula," "determining an intersection," and "changing a parameter value" should be registered independently, in the work of registering the individual exercises the same operation procedure needs to be executed repeatedly from the input of the function formula to the drawing and display of a graph.

SUMMARY

According to an aspect of the invention, there is provided a programmable calculator comprising: a display unit; a calculation processing section configured to perform calculation processing according to user operations; a calculation screen display control section configured to control the display unit to display a calculation screen showing a calculation state that corresponds to the calculation processing performed by the calculation processing section; a base state setting section configured to set, as a base state, a calculation state corresponding to an arbitrary calculation screen in a state that the arbitrary calculation screen is being displayed on the display unit; a base state storing section configured to store the base state that is set by the base state setting section together with the calculation screen corresponding to the base state; an operation pattern storing section configured to store an operation pattern of a series of user operations that are input after the base state was set by the base state setting section, in such a manner that the operation pattern is correlated with the base state; and a guide display control section configured to control the display unit to display a calculation screen corresponding to the arbitrary base state stored in the base state storing section, and to display, as guide indications, the operation pattern that is stored in the operation pattern storing section so as to be correlated with the arbitrary base state.

According to another aspect of the invention, there is provided a computer-readable storage medium containing a sequence of instructions for a program executable by a computer system, the program including: instructions for performing calculation processing according to user operations; instructions for controlling a display unit to display a calculation screen showing a calculation state that corresponds to the calculation processing; instructions for setting, as a base state, a calculation state corresponding to an arbitrary calculation screen in a state that the arbitrary calculation screen is being displayed; instructions for storing the base state that is set together with the calculation screen corresponding to the base state; instructions for storing an operation pattern of a series of user operations that are input after the base state was set, in such a manner that the operation pattern is correlated with the base state; and instructions for controlling the display unit to display a calculation screen corresponding to the arbitrary base state, and to display, as guide indications, the stored operation pattern so as to be correlated with the arbitrary base state.

According to another aspect of the invention, there is provided a programmable calculator including: a user interface; a display unit; a memory; and a processor configured to perform an arithmetic calculations in accordance with commands input through the user interface, the processor being configured to be operable in a guide input mode and a guided calculation mode, wherein, in the guide input mode, the processor operates to: allow a user to input a command through the user interface for setting a current calculation state as a base state; and store the base state and an operation pattern in the memory, the operation pattern being a series of user operations input through the user interface after setting the base state, and wherein, in the guided calculation mode, the processor operates to: control the display unit to display a calculation screen corresponding to the base state and guide indications showing the operation pattern.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

DETAILED DESCRIPTION

Figure 1:
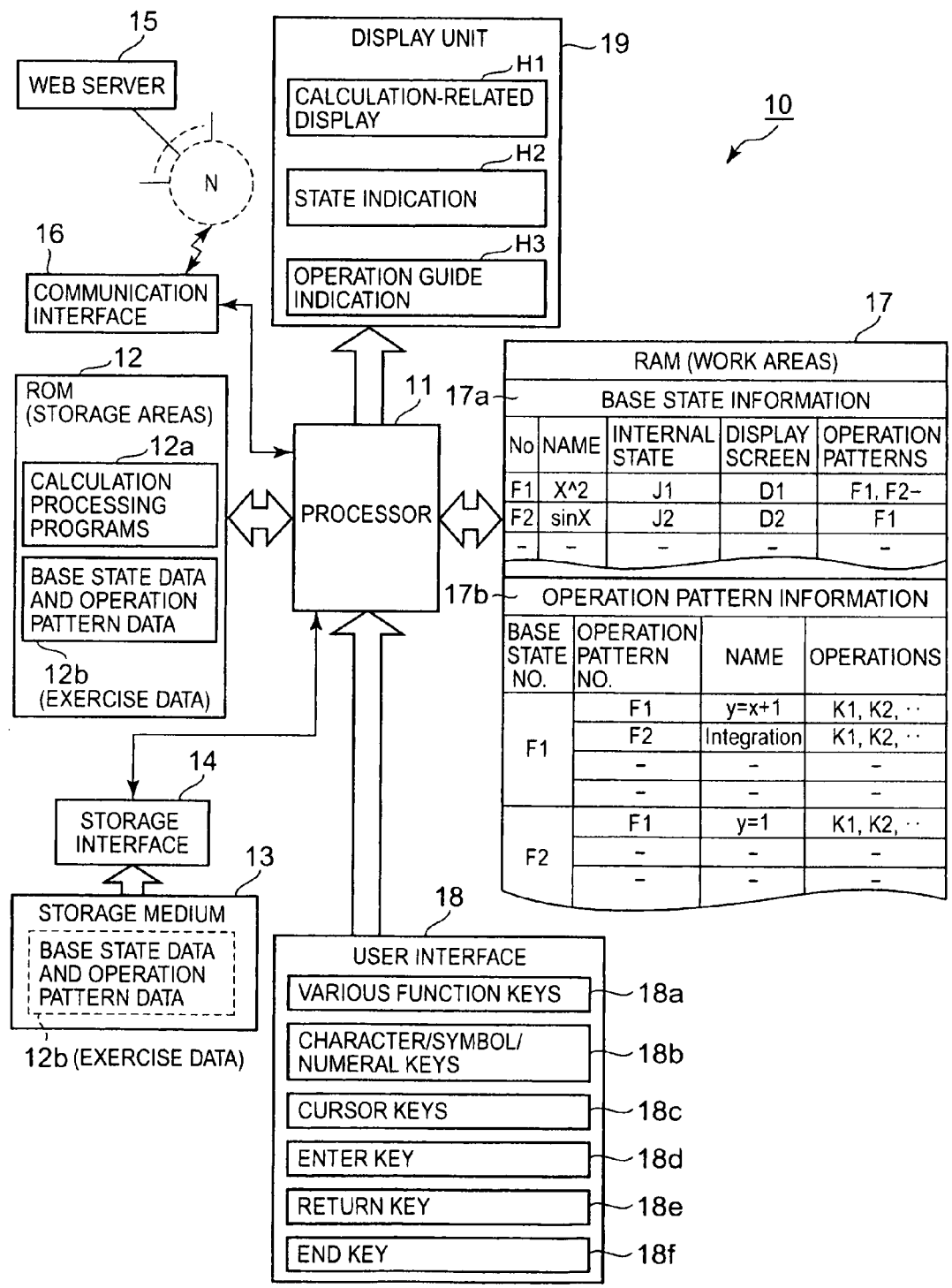
FIG. 1 is a block diagram showing the configuration of an electronic circuit of a programmable calculator as an embodiment of the present invention.

Embodiments according to the present invention will be described in detail with reference to the accompanying drawings. The scope of the claimed invention should not be limited to the examples illustrated in the drawings and those described in below.

FIG. 1 is a block diagram showing the configuration of an electronic circuit of a programmable calculator 10 according to an embodiment of the present invention.

The programmable calculator 10 is equipped with a processor (CPU) 11.

The processor (CPU) 11 controls operation of other circuit sections using a RAM 17 as a work memory according to a system program that is stored in a ROM (storage area, flash ROM) 12 and programmable calculator control programs that have been read into the ROM 12 from an external storage device 13 such as a memory card via a storage interface 14 or programmable calculator control programs that have been downloaded from a Web server (program server) 15 on a communication network N via a network interface 16 and read into the ROM 12. The system program and the programmable calculator control programs stored in the ROM 12 in advance are activated in response to a key input signal supplied from a user interface 18.

In addition to the ROM 12, the storage interface 14, the network interface 16, the RAM 17, and the user interface 18, a display unit (LCD panel) 19 is connected to the processor (CPU) 11.

The ROM 12 is stored, in advance, with a programmable calculator control program for controlling operation of the entire programmable calculator 10. The ROM 12 is also stored with various calculation processing programs 12a which perform various calculation processing according to various formulae that are arbitrarily input by the user and calculation processing for graph drawing and make various calculation-related displays H1 of processes of calculation and calculation results and which register, as exercise data 12b, operation procedures of those calculation processing and displays guide indications H3 for the operation procedure of the various calculation processing according to corresponding registered exercise data 12b.

The exercise data 12b, which includes base state data and operation pattern data, is generated by using a base state information memory 17a and an operation pattern information memory 17b of the RAM 17 and registered in the ROM 12.

The exercise data 12b, which is registered in the ROM 12, is used for displaying guide indications H3 for the operation procedure of calculation processing on the programmable calculator 10. The exercise data 12b may be transferred to the external storage device 13 and stored therein so that the exercise data 12b may be used in other counterpart calculator when the external storage device 13 is connected to the counterpart calculator. The exercise data 12b may be transferred to the counterpart calculator when the counterpart calculator is directly connected to the programmable calculator 10 or may be distributed to other counterpart calculators through a computer network.

Work areas (work memories) are allocated in the RAM 17 to be used as a calculation memory and a display memory for temporary storage of various data that are input to and output from the processor 11 as various calculation processing are performed.

Where a user-arbitrary calculation state is set as a base state during the course of calculation processing to be registered as exercise data 12b, a "base state No." which is assigned automatically, a "name" which is input by the user, "internal states" which are operation states set inside the programmable calculator (i.e., operation states of the CPU 11, the memories, etc.) at the time of the setting, a "display screen" which is display screen data at the time of the setting, and "operation pattern Nos." (described later) which are registered so as to be correlated with the base state are stored in the base state information memory 17a, which is allocated in the RAM 17 as the exercise data 12b is generated.

A key operation pattern of calculation processing that has been performed from a calculation state set as a base state to a return operation or a completion operation is stored in the operation pattern information memory 17b (which is allocated in the RAM 17 when the base state was set) in the form of a "operation No." which is assigned automatically, a "name" which is input by the user, and "operations" which represent key operations so as to be correlated with the "base state No." of the base state.

The user interface 18 is provided with various function keys (including an Fn key) 18a which are operated to specify the functions of various calculation modes provided in the programmable calculator 10, character/symbol/numeral keys 18b which are operated to input a text, a symbol, or numerical data such as a formula having a function, cursor keys 18c (arrows "up," "down," "left," and "right") which are operated to move the input position on the display screen that is indicated by a cursor C, an item, or the like or to scroll the display range, an enter key 18d which is operated to decide on input data or command execution of a calculation, a return key 18e which is operated to cancel processing steps that have been input this time and cause a return to an immediately preceding processing state or cause a return to a processing step of a calculation state that was set as a base state, and a end key 18f which is operated to end a current processing mode.

The display unit 19, which is provided with a dot-matrix type liquid crystal display device, displays a process of calculation or a calculation result of each of various calculation processing in the form of a combination of a calculation-related display H1, a state indication H2, and an operation guide indication H3.

The state indication H2 is to indicate, in the form of a symbol, a current state of one, being performed, of various calculation processing. For example, "REC" is displayed in an operation mode in which an operation procedure of calculation processing is recorded to generate exercise data 12b (mentioned above) and "BASE" is displayed when an arbitrary calculation state has been set as a base state.

Next, an exercise data registering function and an exercise data executing function of the above-configured programmable calculator 10 will be described.

Figure 2:
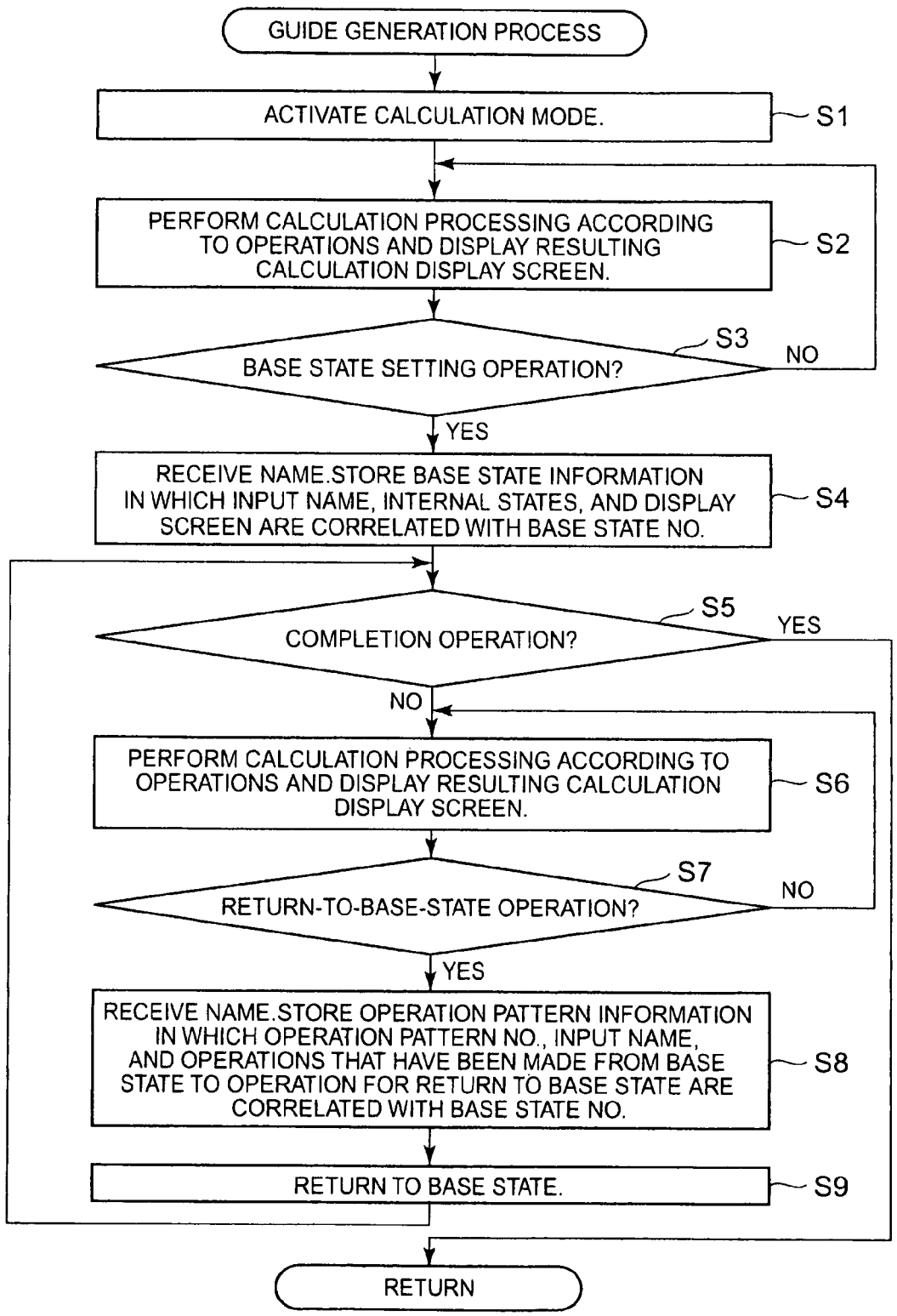
FIG. 2 is a flowchart of a guide generation process for causing an exercise data registering function of the programmable calculator to operate.

FIG. 2 is a flowchart showing an example of a guide generation process (guide generating mode) for causing the exercise data registering function of the programmable calculator 10 to operate.

Figure 3:
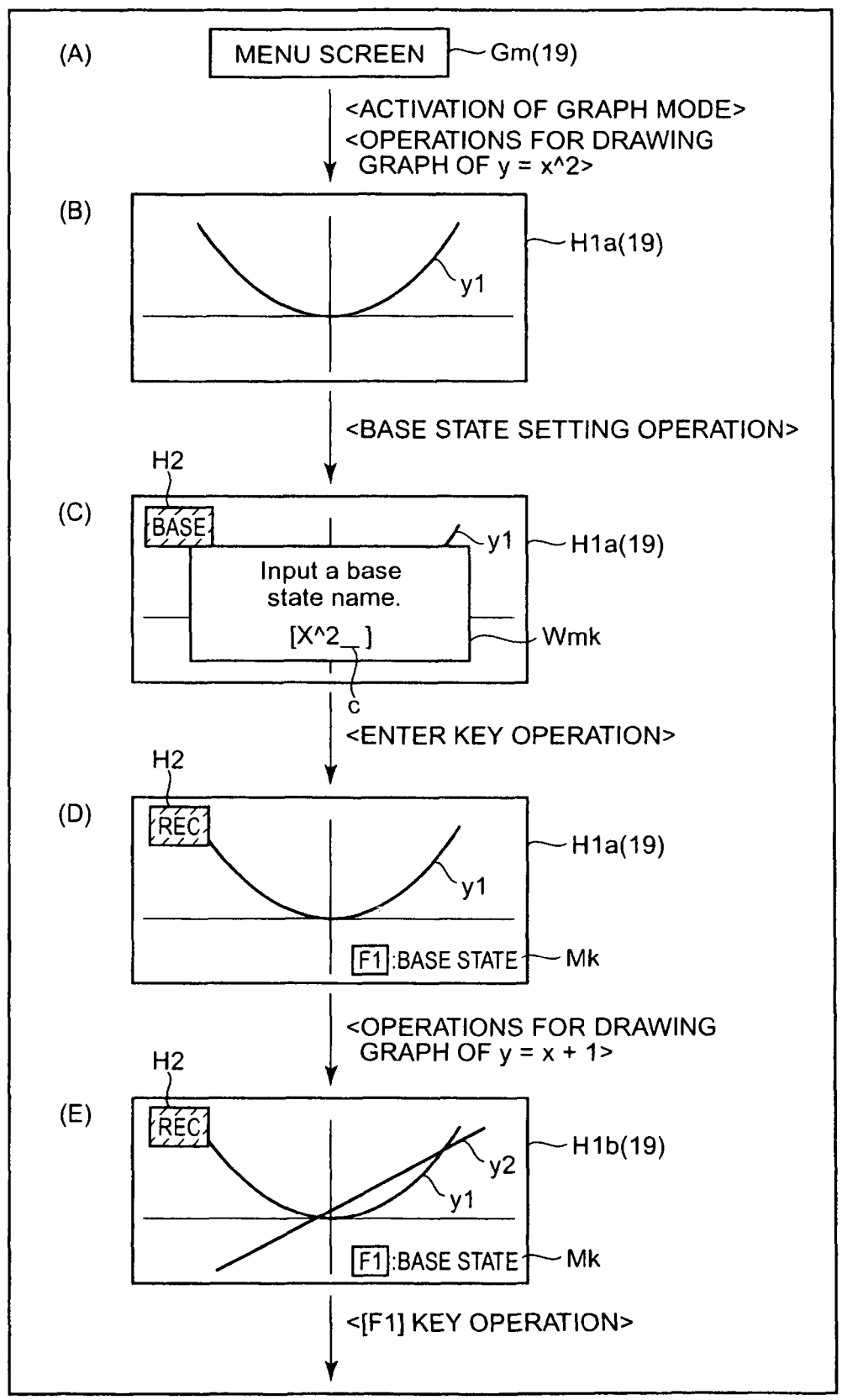
FIG. 3 shows operation display states (part 1) that are associated with the guide generation process of the programmable calculator.

FIG. 3 shows operation display states (part 1) that are associated with the guide generation process of the programmable calculator 10.

Figure 4:
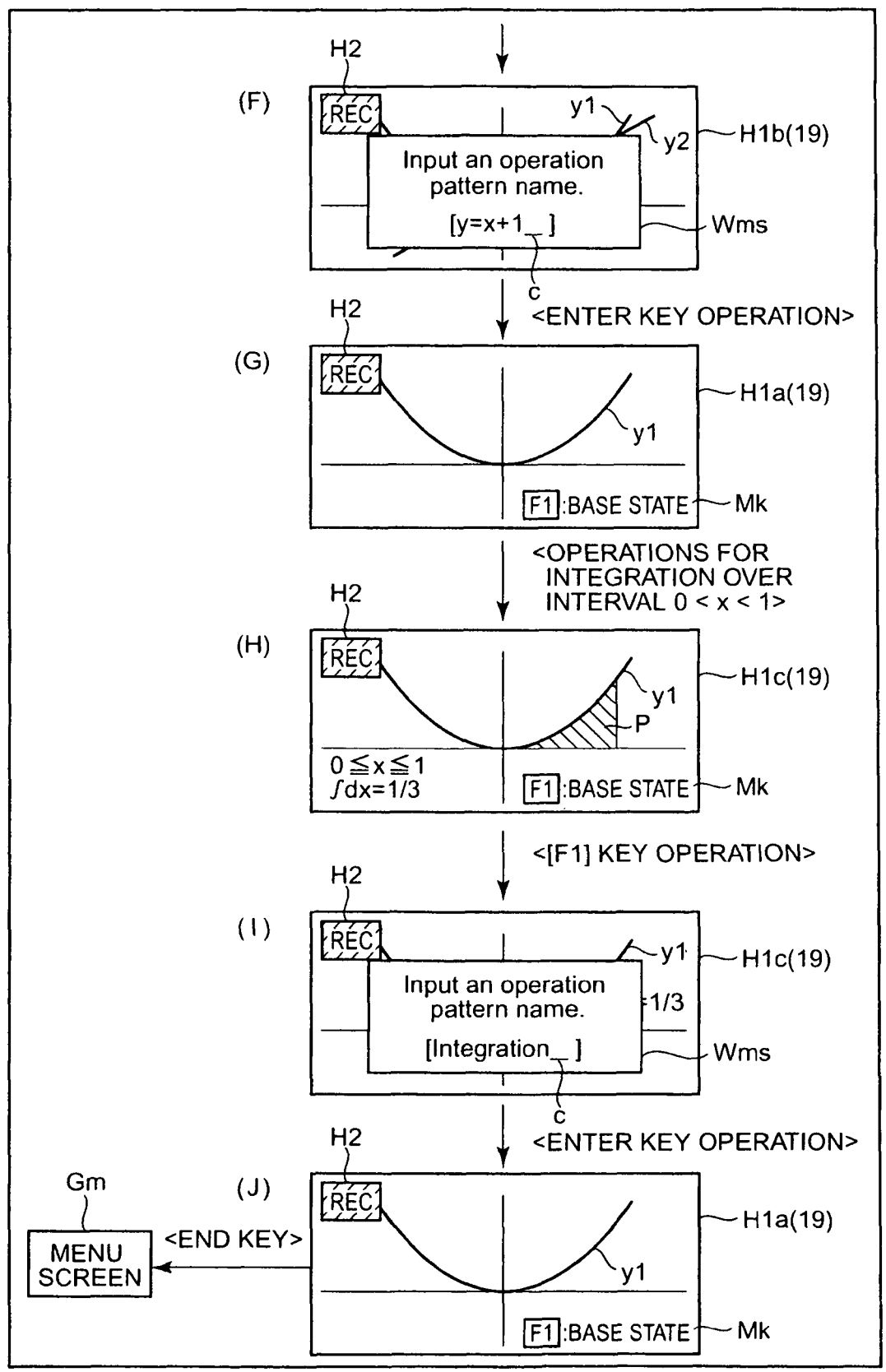
FIG. 4 shows operation display states (part 2) that are associated with the guide generation process of the programmable calculator.

FIG. 4 shows operation display states (part 2) that are associated with the guide generation process of the programmable calculator 10.

When the exercise data registering function included in the various calculation processing programs 12a is activated and the guide generation process of FIG. 2 is started, a menu screen Gm (see section (A) in FIG. 3) of various calculation modes is displayed on the display unit 19.

For example, if a desired function formula "y=x^2" is input and an operation of an instruction (operation) to draw its graph is given in a state that a graph mode is selected through the menu screen Gm and activated (step S1), at step S2 calculation processing for drawing a graph y1 corresponding to the input function formula "y=x^2" is performed and a calculation display screen H1a in which the graph y1 is drawn is displayed on the display unit 19 as shown in section (B) in FIG. 3.

If an operation for setting, as a base state, the calculation state of the programmable calculator 10 in which the graph y1 of the function formula "y =x^2" is displayed is made at this time (S3: yes), at step S4 a state indication "BASE" H2 indicating that the current calculation state is a base state is made and a name receiving window Wmk for prompting the user to input a name of the base state is displayed as shown in section (C) in FIG. 3. If a name "x^2" is input to the name receiving window Wmk and the enter key 18d is operated, pieces of information the name "x^2" which has been input by the user, internal states "J1," and a display screen "D1" are stored in the base stat information memory 17a of the RAM 17 so as to be correlated with a base state No. "F1." As shown in section (D) in FIG. 3, a state indication "REC" H2 indicating that the current calculation state is an operation procedure recording state is made and a return-to-base-state massage Mk indicating that a return can be made to the current base state by operating the F1 key is displayed in the calculation display screen H1a of the current base state.

Then, if a desired function formula "y=x+1" is input in the base state F1 of the calculation display screen H1a in which the graph y1 of the function formula "y=x^2" is displayed and an instruction (operation) to draw its graph is given, at step S6 calculation processing for drawing a graph y2 corresponding to the input function formula "y=x+1" is performed and a calculation display screen H1b in which the graph y2 is superimposed on the graph of the base state F1 is displayed as shown in section (E) in FIG. 3.

At steps S6 and S7, calculation display screens H1 corresponding to kinds of calculation processing are displayed sequentially as the kinds of calculation processing are performed according to user operations until an instruction to return to the base state is given by a user operation on the F1 key.

For example, if an instruction to return to the base state is given by a user operation on the F1 key (S7: yes) to record, as a first operation pattern, a series of operations from the base state (i.e., the calculation state that the graph y1 of the function formula "y=x^2" is displayed) to the calculation state that the graph y2 of the function formula "y=x+1" is displayed and to record other operation patterns, at step S8 a name receiving window Wms for prompting the user to input a name of the current operation pattern is displayed as shown in section (F) in FIG. 4. If a name "y=x+1" is input to the name receiving window Wms and the enter key 18d is operated, an operation pattern No. "F1," the name "y=x+1" which has been input by the user, and key operations "K1, K2, . . . " that have been made from the base state to the operation for causing a return to the base state are stored in the operation pattern information memory 17b of the RAM 17 so as to be correlated with the base state No. "F1."

At step S9, a return is made to the base state F1 (calculation display screen H1a), whereupon as shown in section (G) in FIG. 4 a state indication "REC" H2 indicating that the current calculation state is an operation procedure recording state is made and a return-to-base-state massage Mk indicating that a return can be made to the current base state by operating the F1 key is displayed.

For example, if operations for integrating the graph y1 over the interval 0≦x≦1 are made from the base state F1 (calculation display screen H1a in which the graph y1 of the function formula "y=x^2" is displayed), at step S6 integration processing is performed according to the user operations and a calculation display screen H1c in which an integration area P and an integration result "∫dx=⅓" are superimposed on the graph y1 of the base state is displayed on the display unit 19 as shown in section (H) in FIG. 4.

Also in this case, at steps S6 and S7, calculation display screens H1 corresponding to kinds of calculation processing are displayed sequentially as the kinds of calculation processing are performed according to user operations until an instruction to return to the base state is given by a user operation on the F1 key.

If an instruction to return to the base state is given by a user operation on the F1 key (S7: yes) to record, as a second operation pattern, a series of operations from the base state (i.e., the calculation state that the graph y1 of the function formula "y=x^2" is displayed) to the calculation state that the integration result is displayed, at step S8 a name receiving window Wms for prompting the user to input a name of the current operation pattern is displayed as shown in section (I) in FIG. 4. If a name "Integration" is input to the name receiving window Wms and the enter key 18d is operated, an operation pattern No. "F2," the name "Integration" which has been input by the user, and key operations "K1, K2, . . . " that have been made from the base state to the operation for causing a return to the base state are stored in the operation pattern information memory 17b of the RAM 17 so as to be correlated with the same base state No.

At step S9, a return is again made to the base state F1 (calculation display screen H1a), whereupon as shown in section (J) in FIG. 4 a state indication "REC" H2 indicating that the current calculation state is an operation procedure recording state is made and a return-to-base-state massage Mk indicating that a return can be made to the current base state by operating the F1 key is displayed.

If the end key 18f is operated (S5: yes) in a state that that the first operation pattern from the base state F1 (calculation display screen H1a in which the graph y1 is displayed) to display of the calculation display screen H1b in which the graph y2 is displayed and the second operation picture from the base state F1 to display of the calculation display screen H1c in which the integration area P and the integration result "∫dx=⅓" are shown are recorded, a menu screen Gm of various calculation modes is displayed and a return is made to the initial state of the guide generation process.

The base state data stored in the base state information memory 17a and the operation pattern data stored in the operation pattern information memory 17b are read out and registered as exercise data 12b in the ROM 12 or the external storage medium 13, such as a memory card.

As described above, in the guide generation process of the exercise data registering function, a calculation state desired by a user is stored in the base state information memory 17a as a base state and a key operation procedure of a calculation processing history corresponding to user operations made from the base state is stored in the operation pattern information memory 17b as one operation pattern that is correlated with the base state every time a return is made to the base state. This makes it unnecessary to perform calculation processing for plural times for reaching a common calculation state in generating exercise data 12b for performing plural, different kinds of calculation processing from the common calculation state, and thus makes it possible to generate the exercise data 12b with great ease of operation.

Figure 5:
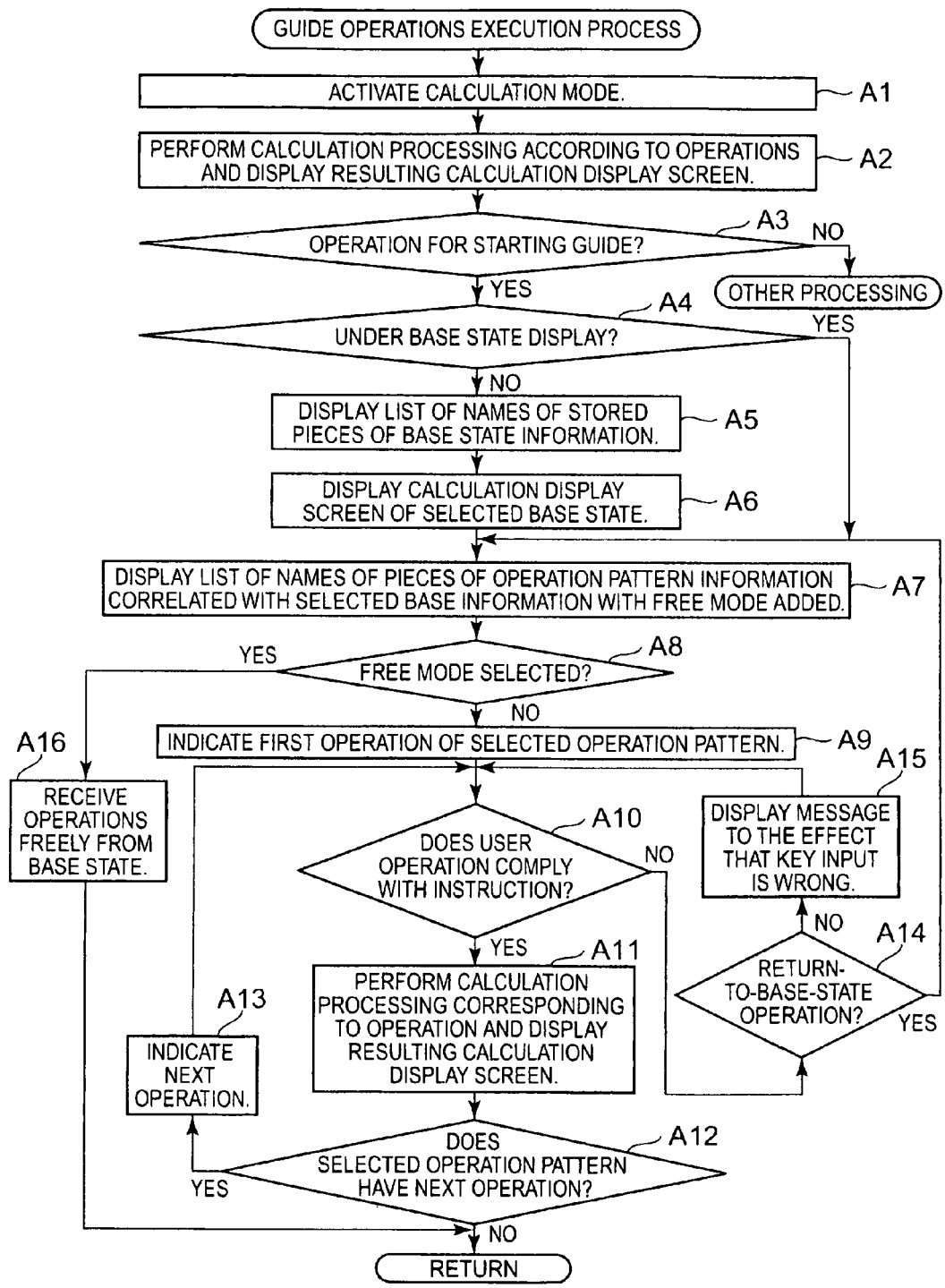
FIG. 5 is a flowchart of a guide operations execution process for causing an exercise data executing function of the programmable calculator to operate.

FIG. 5 is a flowchart of a guide operations execution process (guided calculation mode) for causing the exercise data executing function of the programmable calculator 10 to operate.

Figure 6:
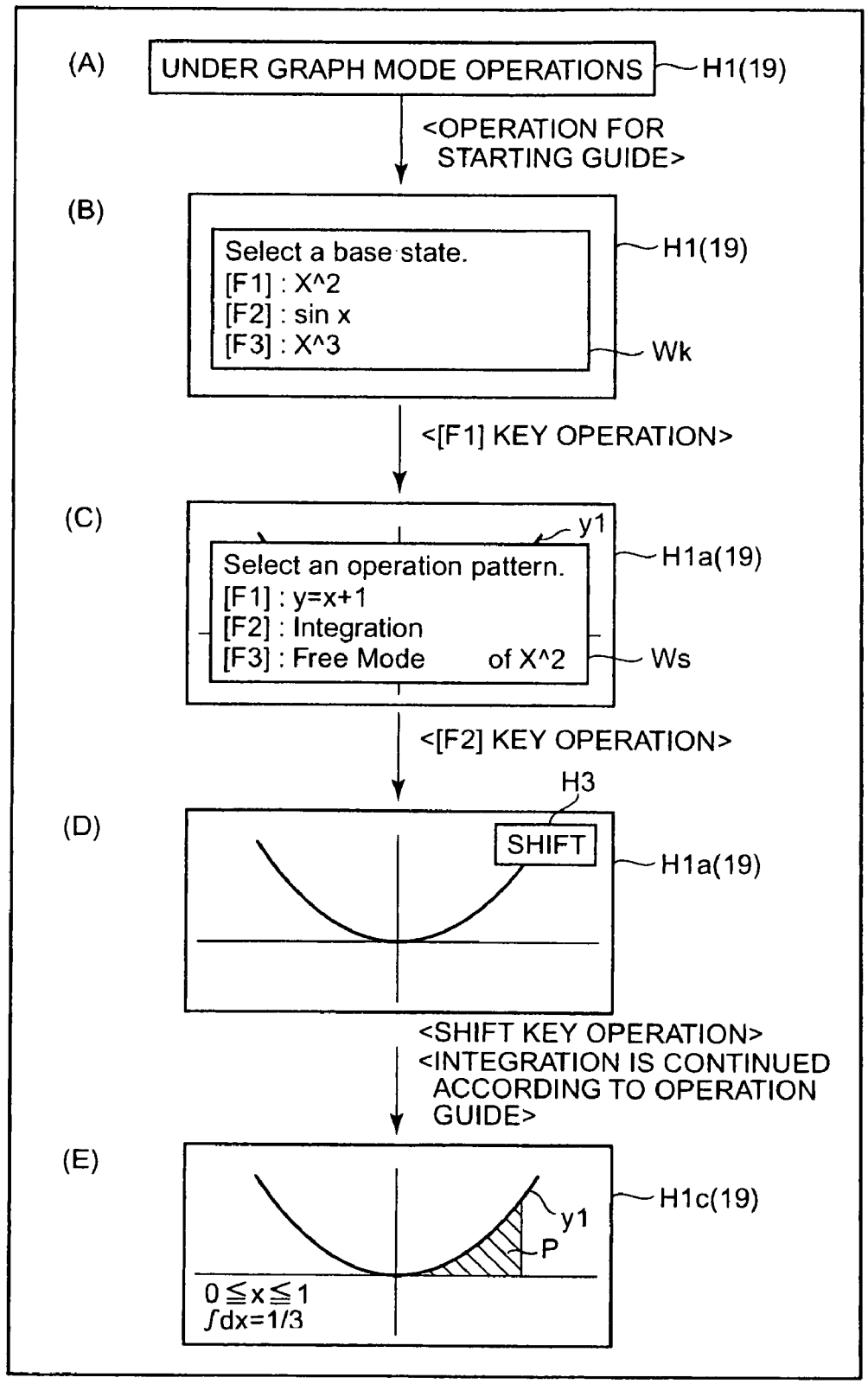
FIG. 6 shows operation display states (part 1) that are associated with the guide operations execution process of the programmable calculator.

FIG. 6 shows operation display states (part 1) that are associated with the guide operations execution process of the programmable calculator 10.

Figure 7:
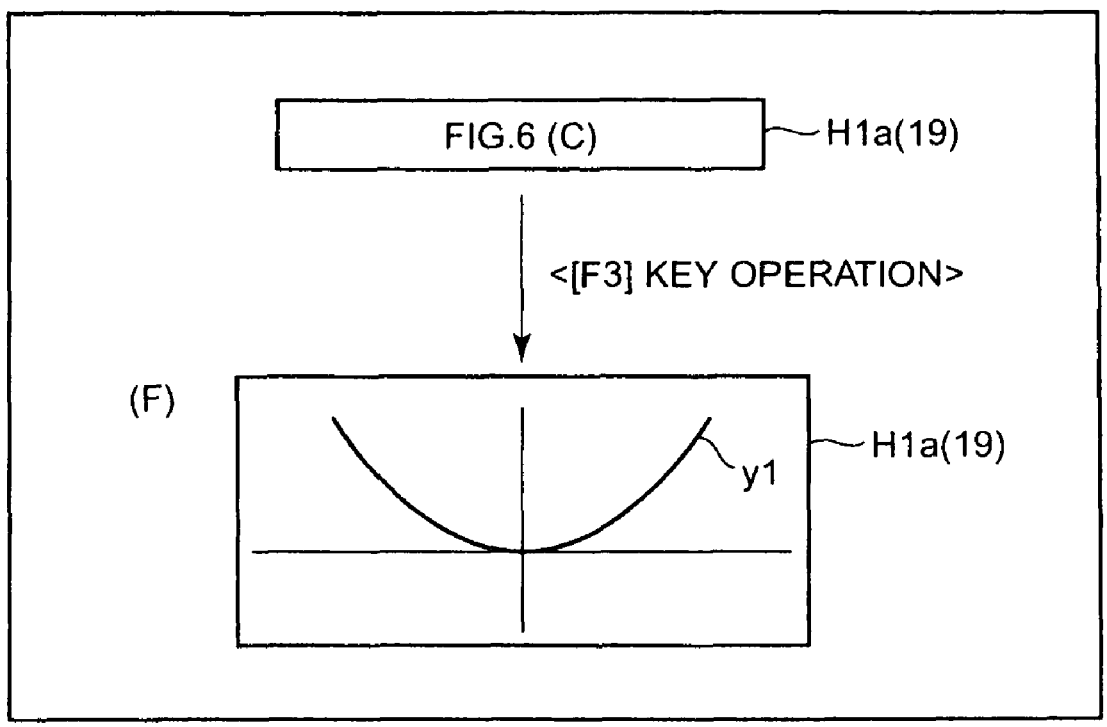
FIG. 7 shows operation display states (part 2) that are associated with the guide operations execution process of the programmable calculator.

FIG. 7 shows operation display states (part 2) that are associated with the guide operations execution process of the programmable calculator 10.

At step A1, a graph mode, for example, is activated as shown in section (A) in FIG. 6 after exercise data 12b that was generated according to the above-described guide generation process has been stored in the ROM 12 or stored in the external storage medium 13 and taken in by the programmable calculator 10. At step A2, a calculation-related display H1 corresponding to calculation processing that has been performed according to user operations is made on the display unit 19. If the exercise data executing function which is part of the various calculation processing programs 12a is activated in this state (A3: yes), the guide operations execution process of FIG. 5 is started.

At step A4, whether a base state indication is being made is determined depending on whether the content of the current calculation-related display H1 being made on the display unit 19 is the same as that of a display screen Dn of one base state Fn of the base states of the base state data (17a) registered in the exercise data 12b.

When determined that a base state indication is not being made (A4: no), at step A5 names (e.g., "x^2" (F1), "sinx" (F2) and "x^3" (F3)) of the respective base states Fn registered in the exercise data 12b are read out and displayed in a base state list window Wk as shown in section (B) in FIG. 6.

If, for example, the base state F1 having the name "x^2" is selected as a base state from which the user wants to start a current exercise by operating the F1 key, at step A6 the internal states "J1" of the selected base state F1 having the name "x^2" are read out and reflected as internal states of the CPU 11, the memories, etc. At the same time, the display screen "D1" of the base state F1 is read out and a calculation display screen H1a in which a graph y1 of "y=x^2" is drawn is displayed on the display unit 19 as shown in section (C) in FIG. 6.

As soon as the programmable calculator 10 has been set to the calculation state corresponding to the base state F1 which is desired by the user, at step A7 names ("y=x+1" (F1) and "Integration" (F2)) of the respective operation patterns Fn that are registered as the operation pattern data (17b) so as to be correlated with the base state F1 are read out and displayed in an operation pattern list window Ws as shown in section (C) in FIG. 6 with a "free mode" (F3) added.

If "Integration" (F2), for example, is selected as an operation pattern desired by the user through the operation pattern list window Ws, at step A9 the first key operation "K1" of the operation pattern F2 which is registered in the operation pattern data (17b) so as to be correlated with the base state F1 is read out and a corresponding operation guide indication H3 (in this case, "SHIFT") is made as shown in section (D) in FIG. 6.

This allows the user to perform, by himself or herself, the key operation indicated by the key operation guide indication H3. When determined that the user has made a key input as indicated by the operation guide indication H3 (A10: yes), at step A11 calculation processing corresponding to the key input is performed and a calculation display screen H1 that reflects a result of the calculation processing is displayed on the display unit 19.

When determined that the selected operation pattern "Integration" (F2) has the next key operation "Kn" (A12: yes), at step A13 the next key operation "Kn" is read out and a corresponding indication is made.

In this manner, every time a guide indication H3 corresponding to a key operation Kn is made, calculation processing corresponding to a key input, by the user, of the operation Kn indicated by the guide indication H3 is performed. As a result, integration processing is performed according to the selected operation pattern "Integration" (F2) and a calculation display screen A1c which shows an integration area P and an integration result "∫dx=⅓" is displayed on the display unit 19 (steps A10-A13).

On the other hand, when determined that a key input that does not comply with the operation guide indication H3 of the selected operation pattern Fn has been made by the user (A10: no), it is determined at step S14 whether the key input is for returning to the base state.

When determined that the key input is for returning to the base state F1 having the name "x^2" (i.e., the F1 key has been operated) (A14: yes), a return is made to step A7, where the operation pattern list window Ws is superimposed on the calculation display screen H1a of the base state in which the graph y1 of $y=x^2$ is displayed (see section (C) in FIG. 6).

When determined that the key input is not for returning to the base state (A14: no), at step A15 a warning message to the effect that the key input made by the user is wrong is displayed on the display unit 19 and the user is thereby prompted to perform an operation that complies with the operation guide indication H3.

In the guide operations execution process being discussed, as described above, in the loop of steps A10-A13 in which calculation processing is performed according to the operation guide indication H3, it is possible to return to the base state F1 having the name "$x^2$" by operating the F1 key and re-select a desired operation pattern Fn through the operation pattern list window Ws (see section (C) in FIG. 6). It is also possible to return to the base state F1 having the name "$x^2$" by selecting "return to the base state" from items "return to the base state," "cancel," and "end" of a context menu (not shown) that is displayed on the display unit 19 when a function key 18a is operated, redisplay the operation pattern list window Ws (see section (C) in FIG. 6), and re-select a desired operation pattern Fn.

On the other hand, when determined that the free mode (F3) has been selected through the operation pattern list window Ws which is superimposed on the calculation display screen H1a of the base state F1 having the name "$x^2$" (see section (C) in FIG. 6) (A8: yes), at step A16 the simple calculation display screen H1a of the base state F1 which shows only the graph y1 (the operation pattern list window Ws is erased) is displayed as shown in section (F) in FIG. 7 to establish a state that no operation guide indication H3 is made and an arbitrary operation of the user can be received.

In the above-described guide operations execution process of the exercise data executing function, if a base state Fn corresponding to a calculation state desired by the user is selected from the base state data (17a) that are registered in the exercise data 12b, calculation processing corresponding to the base state Fn is performed and a resulting calculation display screen H1a is displayed. At the same time, a list window Ws of the operation pattern data (17b) that are registered so as to be correlated with the base state Fn is displayed, which allows the user to select a desired operation pattern Fn and to cause display of a guide indication H3 of each of its key operations. During the course of a calculation exercise in which the user makes operations according to key operation guide indications H3, it is always possible to return to the operation pattern list window Ws that is superimposed on the calculation display screen H1a of the base state Fn by a simple operation and to re-select a desired operation pattern Fn. This makes it unnecessary to repeatedly perform calculation processing for reaching a common calculation state in performing, as exercises, plural, different kinds of calculation processing from the common calculation state, and thus makes it possible to do so with high expression performance and great ease of operation.

In the guide operations execution process of the exercise data executing function, if the user selects, in a base state Fn desired by the user, one of plural operation patterns F1, F2, . . . that are correlated with the base function Fn, pieces of calculation processing corresponding to guide indications H3 for key operations K1, K2, . . . that are recorded as constituting the selected operation pattern are performed in order as the user performs the key operations K1, K2, . . . following the guide indications H3. An alternative configuration is possible in which switching as to whether to make guide indications H3 for key operations K1, K2, . . . of a selected operation pattern is made with timing as desired by the user. This allows the user to make a selection as to whether to make guide indications H3 according to his or her degree of proficiency and to thereby do exercises in a flexible manner.

The procedures of the exercise data registering and executing functions of the programmable calculator 10 according to the first embodiment, more specifically, the procedure of the guide generation process of the exercise data registering function shown in the flowchart of FIG. 2, the procedure of the guide operations execution process of the exercise data executing function shown in the flowchart of FIG. 5, and other procedures, can be distributed being stored as programmable calculator-executable programs in external storage media 13 such as memory cards (ROM cards, RAM cards, or the like), magnetic disks (floppy disks, hard disks, or the like), optical discs (CD-ROMs, DVDs, or the like), or semiconductor memories. The exercise data registering and executing functions according to the first embodiment can be implemented in such a manner that the processor 11 of the programmable calculator 10 reads the programs from the external storage medium 13 into the storage devices 12 and 17 and controls the operation according to the read-out programs, whereby the same kinds of processing as performed according to the above-described procedures can be performed.

Data of the programs for realizing the above procedures can be transmitted over a communication network (e.g., public lines) N in the form of program code. The exercise data registering and executing functions can be implemented in such a manner that the processor 11 of the programmable calculator 10 takes in the program data via the network interface 16 which is connected to the network N.

It is to be understood that the present invention is not limited to the specific embodiments described above and that the invention can be embodied with the components modified without departing from the spirit and scope of the invention. The invention can be embodied in various forms according to appropriate combinations of the components disclosed in the embodiments described above. For example, some components may be deleted from all components shown in the embodiments. Further, the components in different embodiments may be used appropriately in combination.

What is claimed is:

1. An electronic calculator comprising:
a display unit;
a calculation processing section configured to perform calculation processing according to user operations;
a calculation screen display control section configured to control the display unit to display a calculation screen showing a calculation state that corresponds to the calculation processing performed by the calculation processing section;
a base state setting section configured to set, as a base state, a calculation state corresponding to an arbitrary calculation screen in a state in which the arbitrary calculation screen is being displayed on the display unit;
a base state storing section configured to store the base state that is set by the base state setting section together with the calculation screen corresponding to the base state;
an operation pattern storing section configured to store a plurality of operation patterns, each comprising a series of user operations that are input after the base state was set by the base state setting section, such that the operation patterns are correlated with the base state;
an operation pattern list display control section configured to control the display unit to display a calculation screen corresponding to the base state stored in the base state storing section, and to control the display unit to display a list of the operation patterns stored in the operation pattern storing section which correspond to the base state; and a guide display control section configured to control the display unit to display, as guide indications, an operation pattern that is selected by a user operation from among the operation patterns displayed on the display unit by the operation pattern list display control section.

2. The electronic calculator according to claim 1, wherein the guide display control section displays a guide indication for a next operation of the operation pattern every time a user operation corresponding to a current guide indication is performed.

3. The electronic calculator according to claim 2, wherein the guide display control section comprises a return-to-base-state control section configured to control the display unit to redisplay the calculation screen corresponding to the base state stored in the base state storing section in response to a user operation while the guide indications are being displayed, and wherein the return-to-base-state control section causes the operation pattern list display control section to control the display unit to redisplay the list of the operation patterns stored in the operation pattern storing section which correspond to the base state.

4. The electronic calculator according to claim 3, wherein the base state storing section stores a plurality of base states set by the base state setting section together with calculation screens corresponding to the respective base states, wherein the guide display control section comprises a base state list display control section configured to control the display unit to display a list of the base states stored in the base state storing section, and wherein the guide display control section controls the display unit to display a calculation screen corresponding a base state that is selected by a user operation from among the base states displayed by the base state list display control section and display, as guide indications, an operation pattern corresponding to the selected base state.

5. The electronic calculator according to claim 4, wherein the guide display control section comprises a free mode setting section configured to set a free mode according to a user operation while the calculation screen corresponding to the base state is displayed on the display unit, and wherein the electronic calculator further comprises a transition-to-free-calculation control section configured to control the electronic calculator to enter a calculation mode in which calculation processing is performed according to user operations starting from the base state corresponding to the calculation screen displayed on the display unit when the free mode is set by the free mode setting section.

6. The electronic calculator according to claim 5, wherein the guide display control section comprises a guide display switching section configured to switch between displaying and not displaying the guide indications in accordance with a user operation.

7. The electronic calculator according to claim 1, wherein the base state storing section stores a plurality of base states set by the base state setting section together with calculation screens corresponding to the respective base states, wherein the electronic calculator further comprises a base state list display control section configured to control the display unit to display a list of the base states stored in the base state storing section, and wherein the operation pattern list display control section controls the display unit to display a calculation screen corresponding a base state that is selected by a user operation from among the base states displayed by the base state list display control section, and controls the display unit to display a list of the operation patterns stored in the operation pattern storing section which correspond to the base state that is selected by the user operation from among the base states displayed by the base state list display control section.

8. A non-transitory computer-readable storage medium storing a program executable by a computer to control the computer to perform functions comprising:

performing calculation processing according to user operations;

controlling a display unit to display a calculation screen showing a calculation state that corresponds to the calculation processing;

setting, as a base state, a calculation state corresponding to an arbitrary calculation screen in a state in which the arbitrary calculation screen is being displayed;

storing the base state that is set together with the calculation screen corresponding to the base state;

storing a plurality of operation patterns, each comprising a series of user operations that are input after the base state was set, such that the operation patterns are correlated with the base state;

controlling the display unit to display a calculation screen corresponding to the base state, and controlling the display unit to display a list of the stored operation patterns which correspond to the base state; and controlling the display unit to display, as guide indications, an operation pattern that is selected by a user operation from among the operation patterns displayed on the display unit.

* * * * *